UNITED STATES PATENT OFFICE.

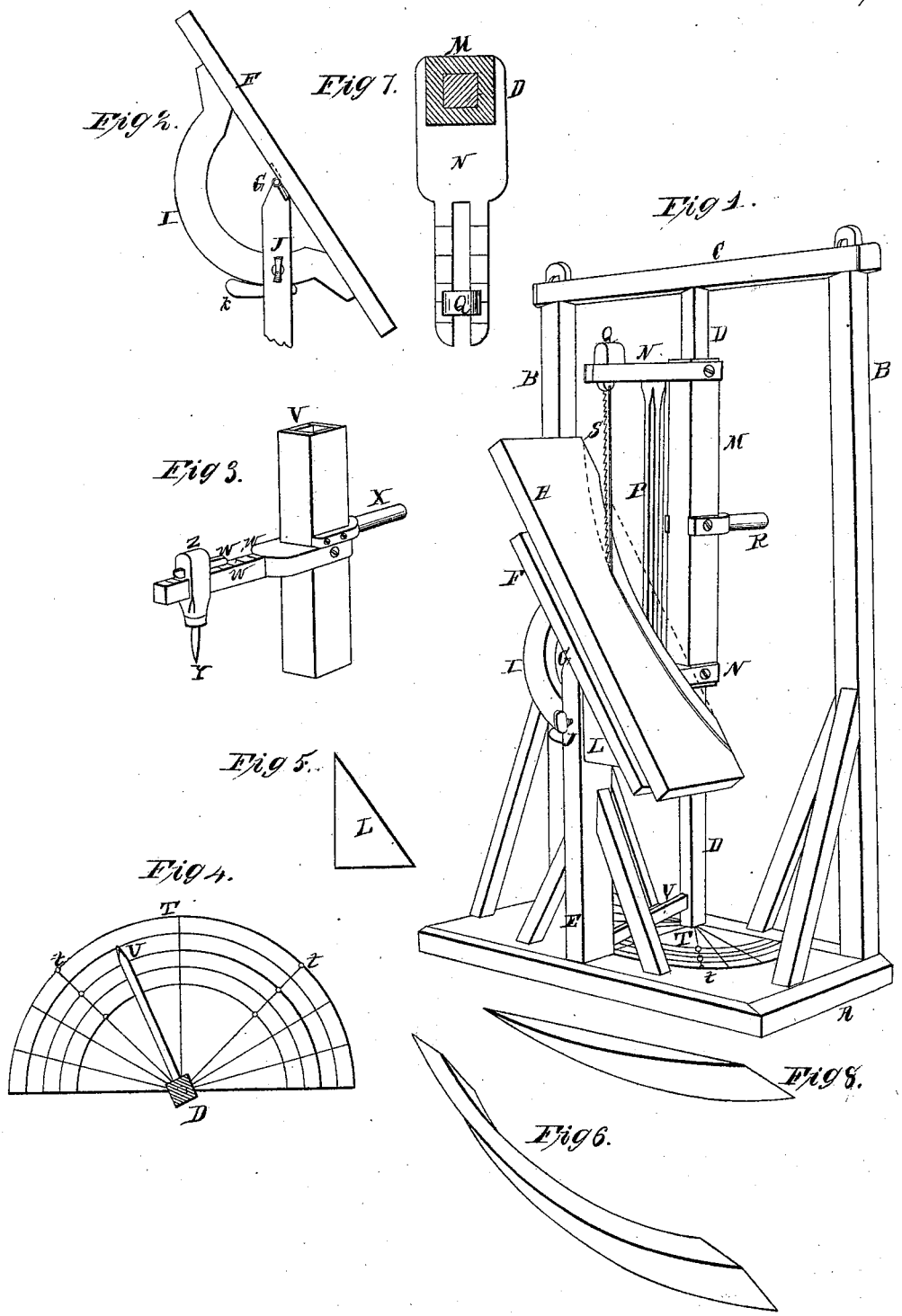

JOHN BROWN, OF MEMPHIS, TENNESSEE.

SAWING HAND-RAILS FOR STAIRS.

Specification of Letters Patent No. 5,336, dated October 23, 1847.

*To all whom it may concern:*

Be it known that I, JOHN BROWN, of the town of Memphis, in the county of Shelby and State of Tennessee, have invented a new and useful Machine for Scribing and Sawing Curvilinear Hand-Railings for Stairs, and for other Purposes, which is described as follows, reference being had to the annexed drawings of the same, making a part of this specification.

Figure 1 is a perspective view of the machine showing the saw in the act of passing through the plank and taking off a piece therefrom for a section of the hand-rail—the plank being secured to the turning table previously adjusted to the pitch of the stairs, and the saw adjusted to the diameter of the well hole. Fig. 2, is a side elevation of the inclined table showing the semi-circular arm affixed to the under side of the same and the clamp screw for clamping it at any angle required. Fig. 3, is a perspective view of the scribing tool which is to be put in the place of the saw for scribing the plank. Fig. 4, is a scale marked on the platform or base showing various sized well holes and the pointer or index inserted into the vertical turning shaft to which the saw is attached—a scale being marked on the arms to which the saw and scribing tools are attached. Fig. 5, is a plan of the pitch board for determining the angle at which the inclined table shall be fixed—its mode of application being shown in Fig. 1. Fig. 6 is the piece cut from the plank shown in Fig. 1 in the form of a section of a spiral or helix, which when dressed will form a portion of a geometrical stair hand rail. Fig. 7 top view of one of the arms and box frame. Fig. 8, piece cut from the plank.

It is well known to joiners and others that the most difficult part of their business is that of making hand railing for stairs, particularly when the stairs are of that character technically called "geometrical stairs," and stairs having a continued hand rail requiring a knowledge of conic sections (to a certain degree) and drawing, in order to lay down the multiplicity of lines required before the sections of the hand-rail can be scribed and sawed out; and hence it is that the ordinary house builder seldom pretends to practice this branch of the business of joining; but leaves it to be performed by the practiced stair builders who have heretofore accomplished the work by a difficult process of calculation and manipulation.

Now, the nature of my invention and improvement consists in a certain new and useful discovery of a new mode of combining, arranging, and operating certain well known mechanical devices by which the ordinary joiner may be enabled to scribe and saw out his hand railing with great exactness and despatch. In order to accomplish this desirable end, I fasten the piece of plank from which the hand railing is to be cut, to an inclined rest or table, and apply a saw held in a frame having a vertical vibratory and a horizontal revolving movement on its axis, commencing its operation of cutting the plank at the lower end at a point distant from the center on which the saw works equal to the semi-diameter or radius of the well hole of the stairs for which the railing is intended and continuing to cut through to the upper end gradually raising the saw frame vertically and turning it in the arc of a circle during the operation of cutting, at the termination of which it will be found that a kerf has been cut of the form of the spiral line of the required stair rail. The saw now being brought back to its former position at the bottom of the plank, and the radius of the sweep of the saw being increased equal to the width of the falling face mold to be cut, and the operation repeated, it will be found that a piece of wood of the desired form for a section of the hand railing will be produced without any drawing or scribing, requiring only to be jointed at the ends and dressed on the sides to be ready for fitting together, and adapted most exactly to the pitch of the stairs and the diameter of the well hole (and possessing the required spiral or twist) the former being determined by the application of the perpendicular of the pitch board to the side of the perpendicular post of the inclined rest or table and the hypotheneusenal side to the under surface of the inclined rest or table and making them coincide together, and the latter by setting the saw in the revolving rising and falling frame to the lines of the scales marked on the radial arms of the saw frame and making the rest and saw fast at those points before commencing the operation.

The apparatus that I have used in order to apply my principle of sawing and scribing spiral lines is similar to that represented in the annexed drawings in which A is the base, B B permanent posts braced to the base for confining the movable cap C, in which turns the upper gudgeon of the revolving axle D of the saw frames and scribing frame. E permanent post of the jointed rest braced to the base, and to which the inclined rest is jointed to which the plank to be cut into hand-railing is made fast.

F is the inclined rest. G is the joint on which it turns.

H is the plank made fast to the rest.

I is a semicircular arm combined with the inclined rest and made to turn in a corresponding opening or mortise in the post in which it is fastened at any desired angle by means of the clamp screw J passed through the post and bearing against the semicircular arm.

K is a wedge inserted into the mortise for making the fastening more secure.

L is the pitch board for determining the pitch of the rest.

M is the sliding box frame which carries the saw, made in the form of a box for sliding up and down on the central axle or shaft D which is made square and a little less than the inside of the box so that it may slide freely thereon.

N, N are two horizontal arms fastened to the box frame M, braced by a vertical straining rod P placed between them running parallel with the box-frame—said arms being grooved at their outer extremities (to receive the sliding heads Q in which the saw S is fastened) and graduated or marked with scales.

S is the saw made in the usual manner. R is the handle for moving the saw up and down and in the arc of a circle and is fastened to the box frame.

T is a scale of well holes laid down on the base or foundation of the machine.

U is the pointer or index inserted into the vertical axle or shaft D for determining the lengths of the sections of the rail and the position of the uniting joints.

V, (Fig. 3) is a box-frame carrying the scribing tool. W is an arm fastened to it to which the scribing tool is attached (it may have two scribing tools one above and the other below the arm, to save the necessity of reversing it).

X is a handle fastened to the box frame for moving it. W' is a scale on the arm.

Y is the scribing tool.

Z is the stock having an opening in it to admit the graduated arm over which it slides back and forth as required.

$w$ is a wedge or key for securing it at any point desired. This box frame is put in the place of the box frame of the saw when the plank is required to be scribed before being sawed. This is effected by removing the cap—lifting the box frame of the saw and putting in its place the box frame of the scribing tool and restoring the cap.

The scribing tool may be applied to the upper and under side of the plank before sawing it, and may be adapted for scribing curve lines of various description by changing the inclination of the rest, and the radius of scribing tool. The machine or apparatus is easily adapted to scribing and sawing lines of various degrees of curvature and character for various purposes beside that of hand-railing without departing from the principle upon which the machine operates.

To render the operation of the machine more clear it should be stated that the first thing required, is to saw off the plank of a proper length for the wreath or twist of the rail required: it may then be well to dress it up neatly and out of wind, to such thickness as may be wanted; then prepare the pitchboard in the usual manner of taking the pitch from the end of the steps; this done apply the pitchboard to the under side of the apron as above described then move the apron down until it fits on the quadrant post. The plank for the rail is then secured to the apron and placed in such a position with the pivot post D so that the segment of the circle or face mold designed for the twist or wreath may be described properly upon it. The sliding gage is to be properly adjusted to describe the circle that may be required for the size of the wellhole. Then move it around allowing it to slide up the pivot post the point of the scriber moving on the rail piece and pricking as the needle passes the points of the segment of the circle required which gives the length and joints of the rail required on its outside. Then adjust the scribe awl by moving it out for the width of the face mold and proceed as before and the inside line of the wreath will be described. Care should be taken to pick the rail piece as the joint of the needle U passes the joints of the joints say at $t\ t$ described on the platform T always commencing the circle at the lower end of the rail piece. A line is then drawn across the rail piece from our prick to the other on the opposite sides of the railpiece at each end, which will give the butting joints. Then the cap is to be removed, the sliding gage and awl removed from the pivot post, and the saw frame put on its place in a proper position to saw the first line laid off, commencing at the lower end of the rail piece. The saw is then put in motion by the operator who standing at the back of the frame, holding firmly by the handle R with one hand, and the top of the saw frame with the other moves it up and down the box sliding upon the pivot post, holding the saw firmly against the rail piece until the first line is sawed. The saw and frame are then moved back again, and the saw moved out on the arms so as to increase the radius of its sweep, the width of the face mold of the rail, to saw the other line, proceeding as before; and the wreath is sawed out.

What I claim as my invention and desire to secure by Letters Patent, is—

The mode of scribing and cutting hand railing, for stairs and other purposes, substantially in the manner described; that is to say, by fixing the piece of plank from which the hand railing is to be cut at the required angle of inclination with a horizontal plane determined by the pitch board or other means and scribing with the awl applied to the plank the shape of the required face mold designed for the twist or segment of the wreath of the desired hand rail and then passing the saw through the same in the manner above described and set forth, whether the several parts be arranged in the manner above described or in any other mode or manner substantially the same, by which analagous results are produced.

In testimony whereof I hereunto signed my name before two subscribing witnesses.

JOHN BROWN.

Witnesses:
P. H. WATSON,
A. E. H. JOHNSON.